(12) United States Patent
Roetzel

(10) Patent No.: US 6,945,765 B2
(45) Date of Patent: Sep. 20, 2005

(54) HYDRAULIC CLAMPING DEVICE FOR MOLDING MACHINES

(75) Inventor: Hartmut Roetzel, Munsbach (LU)

(73) Assignee: Sandretto Industrie S.p.A., Collegno Turin (IT)

( * ) Notice: Subject to any disclaimer, the term of this patent is extended or adjusted under 35 U.S.C. 154(b) by 201 days.

(21) Appl. No.: 10/400,533

(22) Filed: Mar. 28, 2003

(65) Prior Publication Data

US 2003/0215541 A1 Nov. 20, 2003

(30) Foreign Application Priority Data

Apr. 18, 2002 (IT) .................................... MI2002A0820

(51) Int. Cl.[7] .............................................. B29C 45/64
(52) U.S. Cl. .................... 425/171; 425/190; 425/595
(58) Field of Search ................................ 425/169, 171, 425/190, 589, 595, 450.1, 451.9

(56) References Cited

U.S. PATENT DOCUMENTS

| | | | |
|---|---|---|---|
| 2,916,768 A | | 12/1959 | Quere et al. |
| 2,976,569 A | * | 3/1961 | Quere et al. ................. 425/590 |
| 3,606,641 A | * | 9/1971 | Carrieri et al. ............. 425/595 |
| 5,192,557 A | | 3/1993 | Hirata et al. |
| 5,320,517 A | | 6/1994 | Hirata et al. |
| 5,853,773 A | * | 12/1998 | Choi .......................... 425/595 |
| 5,928,684 A | * | 7/1999 | Glaesener et al. .......... 425/595 |
| 5,928,685 A | * | 7/1999 | Schad ........................ 425/595 |
| 6,093,361 A | * | 7/2000 | Schad ........................ 425/595 |
| 6,132,201 A | * | 10/2000 | Looije et al. ............... 425/595 |
| 6,200,123 B1 | | 3/2001 | Mailliet et al. |
| 6,250,905 B1 | * | 6/2001 | Mailliet et al. ............. 425/595 |
| 6,524,091 B2 | * | 2/2003 | Romi ......................... 425/595 |

FOREIGN PATENT DOCUMENTS

| | | |
|---|---|---|
| DE | 1155885 | 10/1963 |
| EP | 0747197 | 12/1996 |
| EP | 1225025 | 7/2002 |
| EP | 1287967 | 3/2003 |
| GB | 1601419 | 10/1981 |
| JP | 02018009 | 1/1990 |
| WO | WO 98/51468 | 11/1998 |

* cited by examiner

Primary Examiner—James P. Mackey
(74) Attorney, Agent, or Firm—Young & Thompson

(57) ABSTRACT

The clamping comprises a tie-bar which extends between a fixed and a movable platen of a molding machine, with respect to the first, and hydraulically operated locking means for engaging the tie bar and generating the clamping force. The locking means comprises a hydraulic cylinder having a hollow sleeve and piston provided with internal toothings, in axially spaced apart positions. The sleeve and piston unit is made to rotate and slide axially, to selectively engage and disengage with the toothed head at the end of the tie bar to allow step and fine adjustments of the position of the movable platen, in relation to the thickness of the mold.

8 Claims, 4 Drawing Sheets

HYDRAULIC CLAMPING DEVICE FOR MOLDING MACHINES

BACKGROUND OF THE INVENTION

This invention refers to the general field of the molding machines, such as injection molding, die casting and press molding machines; in particular the invention is directed to a clamping device for clamping the mold-support platens of a molding machine, suitable for allowing the tightening and the adjustment of the platens in a plurality of clamping positions for molds of different thickness and size.

The invention is also directed to a molding machine of the type previously referred to, provided with a similar adjustable clamping device.

In several molding fields, for example in the injection molding field for plastic materials, there exist several types of molding machines or presses which make use of different mechanisms or clamping systems for locking the mold support platens, which allow a certain degree of adjustment for molds of different thickness and size.

Usually such molding machines comprise a stationary or fixed mold-support platen, and a movable mold-support platen which, in the closed condition of the machine, tightly clamp the two mold members by means of forces exerted by hydraulic cylinders directly or indirectly acting on appropriate tie bar which extend between the platens of the machine.

Molding machines provided with mechanical clamping devices are known, for example, from U.S. Pat. Nos. 2,916,768, 5,192,557, 5,320,517, WO 98/51468, and U.S. Pat. No. 6,200,123.

In particular, U.S. Pat. No. 2,916,768 describes an injection molding press, in which the tie-rods for transmitting the clamping force extend from a movable platen supporting a first mold member, towards a fixed platen supporting a second mold member, and in which each tie rod comprises at one end, a toothed head designed to engage with a corresponding clamping sleeve on the stationary platen, in a position aligned with the tie bar.

The clamping sleeve is simply made to rotate by means of a worm drive, to engage and disengage with the toothed head of the tie bar in a single coupling position.

The dispacement of the movable platen towards and away from the fixed platen is performed by means of an appropriate hydraulic cylinder, while the rated clamping force for closing the mold is produced by separate hydraulic cylinders axially aligned to the tie bars.

In presses on molding machines of the aforesaid kind, in order to change the relative position of the two platens supporting the two mold members, and to adapt their disposition to molds of different thickness or size, it is necessary to change and adjust the axial extension of the tie bars by means of complicated operations which involve prolonged machine downtimes, resulting in a consequent low productivity.

The adjusting operations for adapting the press to molds of different thickness or size, as well as the time required for the opening and closing operations, have therefore considerable repercussions on the entere working cycle time.

WO 98/51468 describes an injection molding machine of the type previously referred to, in which use is also made of clamping sleeves, on the fixed platen of the machine, and in which each clamping sleeve is connected to the piston of a hydraulic cylinder designed exclusively for generating the clamping force necessary for closing the two half molds.

Each clamping sleeve is consequently provided with a single set of teeth to engage with a toothed head of a respective tie rod in a single axial position.

In this type of machine also, the adjustment of the clamping position is obtained by means of wholly conventional systems, requiring again an adjustment of the axial extension of the tie bars as in the previous case; once again, all this entails time consumption and complexity in handling the machine, with a consequent negative influence on the working cycle.

The previously proposed solutions therefore involve complicated operations for carrying out all the necessary adjustments of the tie bars, as well as are time consuming for closing and clamping the molds, which are unsuitable for fast cycle molding machines.

In molding machines there is also a need to make automatically adjustments, and to carry out the closing and clamping of a mold, as quickly as possible in order to reduce the downtimes in a production cycle.

In order to partially solve this problem, U.S. Pat. No. 5,320,517 proposes some solutions according to which use is made of clamping jaws fitted into the piston of a hydraulic clamping cylinder to engage a threaded portion of a tie bar, and in which the axial position of the tie bar is determined by an adjustable stop member screwed into a threaded bush.

During the clamping of the platens, after the tie bars have come into contact with the stop members, the clamping jaws are tightened against the threaded ends of the tie bars, while the piston members slowly move within their respective cylinders.

Upon completion of the clamping step, the hydraulic cylinders are fed with pressurised oil to generate the required clamping force.

Even though this solution permits an axial adjustment of the clamping device, in practice it appears to be again a somewhat complicated, due to that its requires costly machining operations to provide the screw threads along the tie bars, which must consequently undergo expensive surface treatments in order to withstand the high contact forces, which would otherwise cause deformation and considerable wear.

Moreover, the time required for adjusting the stop members and for clamping the locking jaws, is still comparatively long with respect to cycle times in the range of seconds, for fast-cycle machines.

Lastly, U.S. Pat. No. 6,200,123 describes an injection molding press having two stationary platens, rigidly connected by four side tie bars, and an intermediate movable platen which is made to reciprocate in respect to the stationary platens of the press.

The movable platen is urged against one of the stationary platens by a central hydraulic device comprising a force-transmitting tie bar which extends through the hollow piston of a hydraulic control cylinder designed exclusively to generate the clamping force. A locking bush is mechanically connected to rotate in respect to the piston of the hydraulic cylinder, and is provided with axial rows of teeth to engage with corresponding axial rows of teeth on the central tie bar; the mold thickness adjustment is performed by screwing in and out the clamping bush to change the clamping position exclusively in relation to the pitch between the teeth of the tie bar.

This solution also substantially presents the same drawbacks as the previous devices.

OBJECTS OF THE INVENTION

There is consequently a need of a clamping device for molding machines which is structurally simple, allows a more accurate and precise adjustment of the clamping positions, and fast opening and closing operations of the molds for use in fast-cycle molding machines.

Therefore, the main object of this invention is to provide an automatic clamping device for molding machines and in particular for injection-molding presses, as an alternative to the previously known systems, which is adjustable and capable of continuously adapting to molds of different thickness and size within a pre-established setting range, and at the same time to achieve selective and quick clamping operations by means of an extremely short clamping stroke, in a range of a few millimetres, due to an appropriate construction and configuration of the clamping device.

A further object of this invention is to achieve the above by means of a structurally simple, inexpensive and highly reliable solution, which does not call for complex machining operations.

A still further object of this invention is to provide a clamping device of the aforementioned kind, which makes use of a simple hydraulic actuator, for changing the clamping positions and for generating a clamping force thereby allowing the molding machine to be used with molds of different thickness within an ample range of sizes, by selective step and fine adjustments of a number of different clamping positions.

A still further object of the invention is to provide a molding machine of the types referred to, provided with a clamping device of the aforementioned kind, whereby it is possible to considerably reduce the downtimes, as well as the overall dimensions of the same machine, simplifying the routine maintenance operations, and also reducing the space required to carry them out.

BRIEF DESCRIPTION OF THE INVENTION

According to a first aspect of the invention, a hydraulic clamping device has been provided for a molding machine comprising:

first and second mold support platens, one of said mold support platens being movable in respect to the other one;

a tie-bar axially extending from one of the platens, said tie-bar having a toothed head at one end;

mold-thickness adjustment and tie-bar clamping means on the other one of said platens, for clamping the toothed head of the tie-bar, said mold-thickness adjustment and clamping means comprising:

a clamping sleeve and piston unit having a tie-bar passing through hole, and axially spaced apart tooth members inside the clamping sleeve;

said clamping sleeve and piston unit being axially movable and rotatably supported for a fine adjustment of its position and to selectively engage and disengage the toothed head of the tie-bar in a plurality of axially arranged locking positions defined by said tooth members of the clamping sleeve; and control means to rotate the said sleeve and piston unit in each of said locking positions defined by the tooth members of the clamping sleeve.

BRIEF DESCRIPTION OF THE DRAWINGS

These and further features and advantages of this invention, will be more clearly evident from the following description with reference to the accompanying drawings, in which.

DETAILED DESCRIPTION OF THE INVENTION

Figure 1:
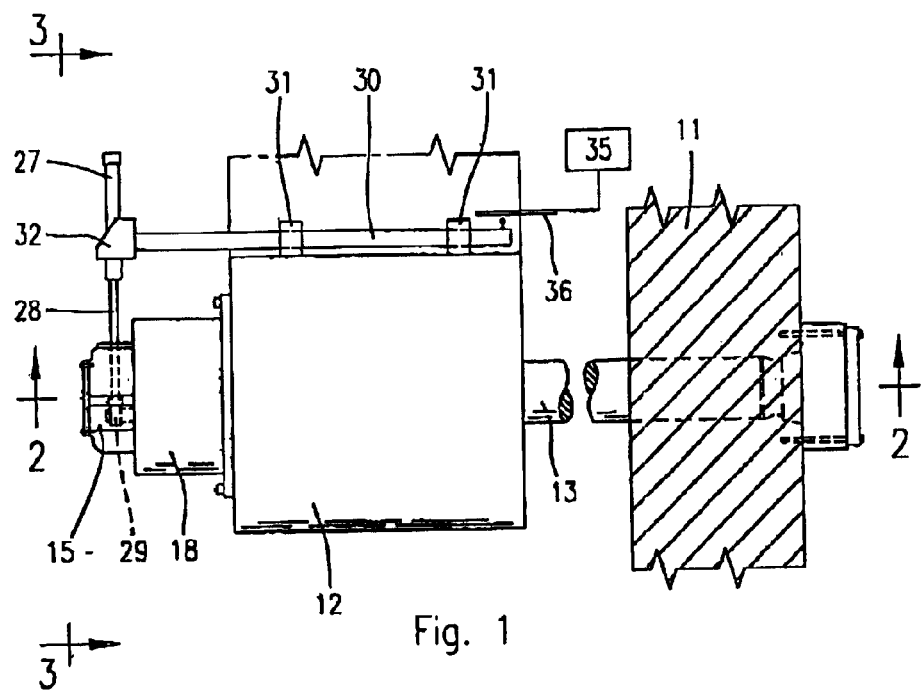
FIG. 1 shows a view of a hydraulic clamping device according to the invention.
Figure 2:
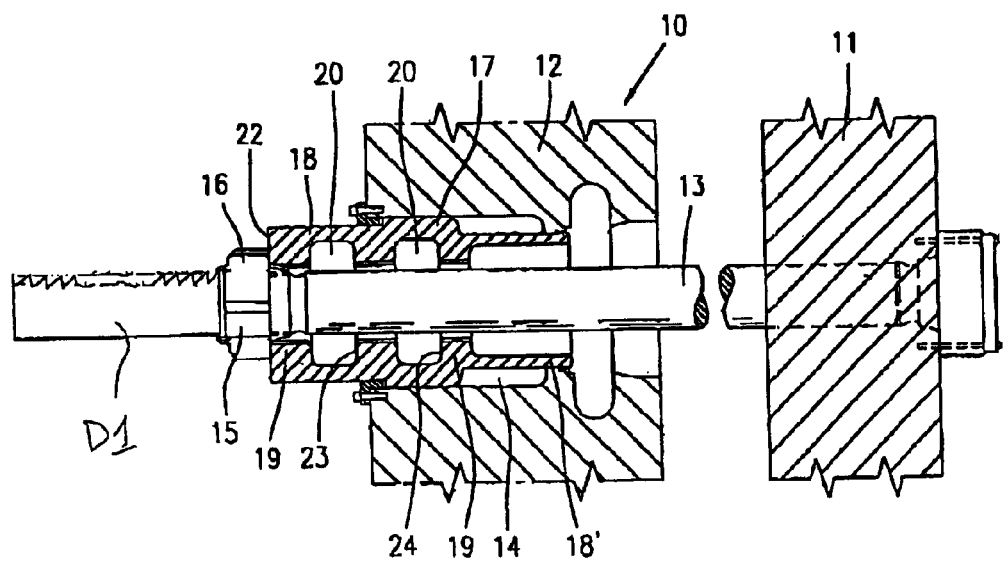
FIG. 2 shows a longitudinal cross-sectional view, along the line 2—2 of FIG. 1.
Figure 3:
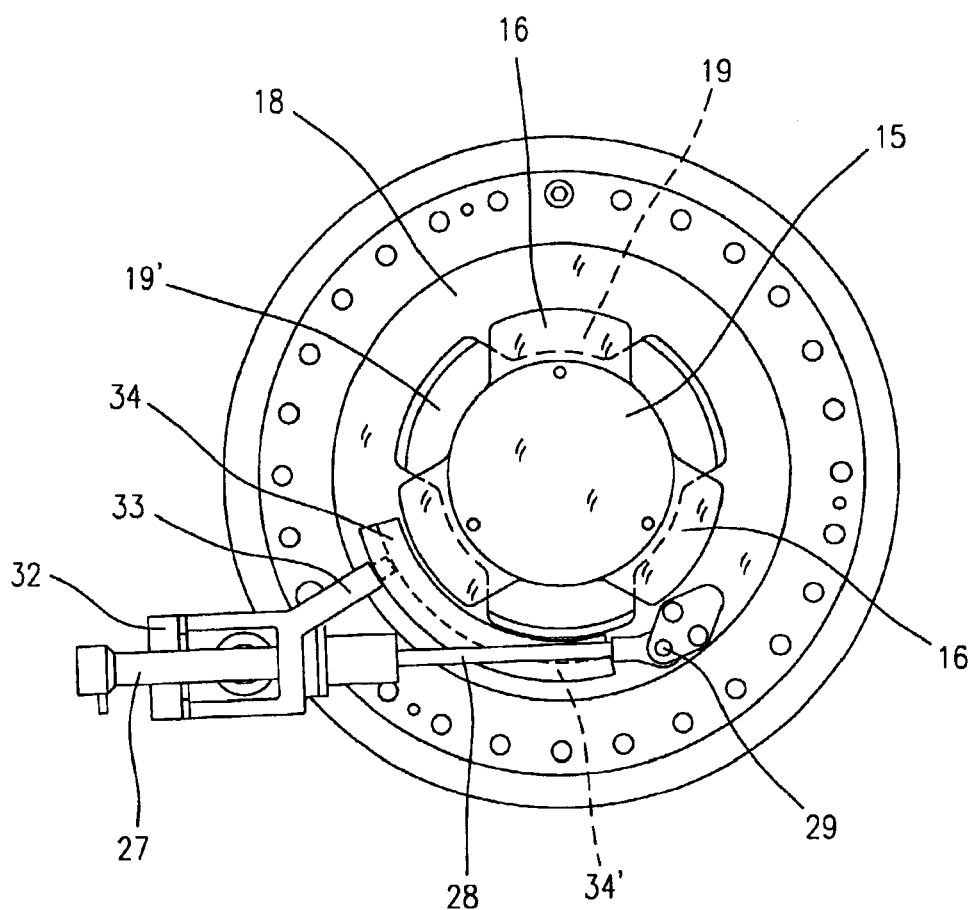
FIG. 3 shows a front view along the line 3—3 of FIG. 1.

With reference to the FIGS. 1 to 3, a description will be now given of a first embodiment of a clamping device according to the invention for an injection molding machine.

The clamping device, generically indicated by the reference number 10, extends between a first and a second structural frame member, for example between a first mold-support platen 11 and a second mold-support platen 12 one of which is movable in relation to the other one to reciprocate between a first mold closing position and, respectively, a second opening position for a mold having a given thickness or size.

In the example of FIGS. 1–3, the clamping device comprises a tie bar 13 for transmitting the clamping force, fastened to the platen 11; the tie-bar 13 extends towards and through clamping means on the platen 12, comprising a clamping sleeve and piston unit 17, 18 of a hydraulic control cylinder 14, as shown.

In particular, the tie bar 13 at its free end is provided with a toothed head 15 having radial teeth, for example teeth 16 angularly spaced apart from one another to engage and disengage said clamping means.

The clamping sleeve 18 and a piston member 17 are sliding and rotatably supported by the control cylinder 14; the sleeve 18 and the piston member 17 therefore define a sleeve and piston unit suitable to perform several functions, in particular: a first locking function for the toothed head 15 of the tie bar 13; a second function for a selective step adjustment of the clamping positions; a third function for the fine adjustment of each clamping position of the clamping sleeve and piston unit, and a forth function for generating the clamping force.

In this connection, the piston 17 comprises on one side, a clamping bush 18 defining an extention of the passing through hole of the same piston, for the tie bar; the clamping sleve 18 is provided with an internal toothing designed to engage the toothed head 15 at the tie bar in several locking positions axially spaced apart from one another.

The internal toothing of the sleeve 18, in correspondence with each axial locking position, comprises a plurality of angularly spaced apart teeth 19 shaped so as to engage with the teeth 16 of the head 15 of the tie bar 13, and to allow them to slide axially, in relation to an angular position assumed by the clamping sleeve and piston unit 17, 18.

The teeth 19 are spaced apart from each other by providing angular slots 20 having a width equivalent to or slightly greater than the thickness of the teeth 16 of the head 15 of the tie bar so that the locking of the same tie bar 13 and the clamping of a mold can take place rapidly by means of a very short rotation and stroke of the sleeve and piston unit 17, 18.

From FIGS. 2 and 3 it can also be seen that the teeth 19 of the clamping sleeve 18 present abutement front surfaces 22, 23 and 24 for abuting against corresponding front surfaces of the teeth 16 of the head 15 forming part of the clamping device.

Unlike the previously known devices, according to this invention the clamping sleeve 18 is integral with or connected to the piston member 17 in order to move and rotate conjointly and to allow a selective positioning of the same clamping sleeve 18 in a required clamping position upon the requirements; it is thus possible to achieve a first step adjustment by selecting different locking positions for clamping molds of different thickness.

The clamping sleeve 18 is also connected to axially slides with the piston 17 to allow a second fine adjustment of each locking position defined by the teeth inside the same sleeve 18.

The sleeve 18 extends from one side of the piston 17 while on the opposite side the piston 17 is provided with a sealing sleeve 18' to tightly close the cylinder 14 in any axial position of the clamping sleeve and piston unit.

According to the example in FIG. 2, the hydraulic cylinder 14 is preferably obtained by machining out the same in the thickness of the platen 12, or can be differently made in such a way as to allow the passage and the sliding of the tie bar 13 with the relevant toothed head 15.

As mentioned previously, this invention lies in the fact that the clamping sleeve and piston unit 17, 18 performs different functions, according to which the same unit is used both as means for providing the rated clamping force for closing the mold, as a means for locking the platens to the tie bars, and also as means for step and fine adjustments of the locking positions in relation to the thickness of the molds.

In order to enable the selective engagement and disengagement between the teeth 16 of the head 15, and the sets of teeth 19 inside the sleeve 18, the sleeve and piston unit is made to rotate between two pre-established angular positions, to align the slots 19' between the teeth 19 of the sleeve 18, respectively the same teeth 19, with the teeth 16 of the head 15.

The angular movement of the sleeve 18 and the piston 17, can be obtained in any appropriate way, by control means operatively connected to the sleeve 18 and the platen 12 supporting the control cylinder 14 and the sleeve piston unit 17, 18.

For example, as shown in FIGS. 1 and 3 it is possible to make use of a control cylinder 27, or other linear actuator having a rod 28 pivoted in 29 to the front end of the sleeve 18.

The cylinder 27 is made movable with the sleeve 18, being supported, for example, by a rod 30 which extends parallel to the axis of the sleeve 18 and which can slide longitudinally to brackets 31.

The rod 30 is provided at the fore end with a bracket 32 for supporting the cylinder 27; as shown in the example of FIG. 3, the bracket 32 is in turn provided with a side arm 33 sliding within a groove 34' of an arch shaped guide member 34 secured frontally to the sleeve 18; thus, the axial movement of the sleeve 18, in both directions, pulls the support bracket 32 for the cylinder 27, at the same time allowing a relative rotation of the sleeve 18 with respect to the same control cylinder 27.

Lastly, means are provided for detecting the axial position of the clamping sleeve 18, operatively connected to an electronic control unit; in this way it is possible to control the position of the sleeve 18 and stop it in any programmed or programmable position.

The means for detecting the position of the clamping sleeve 18 can be made in any way and be of any suitable type; for example as shown in FIG. 1 they are in the form of a linear detector 36, capable of provide electric control signals to an electronic control unit 35, or to a control unit which governs the entire operative cycle of the molding machine.

Figure 4:
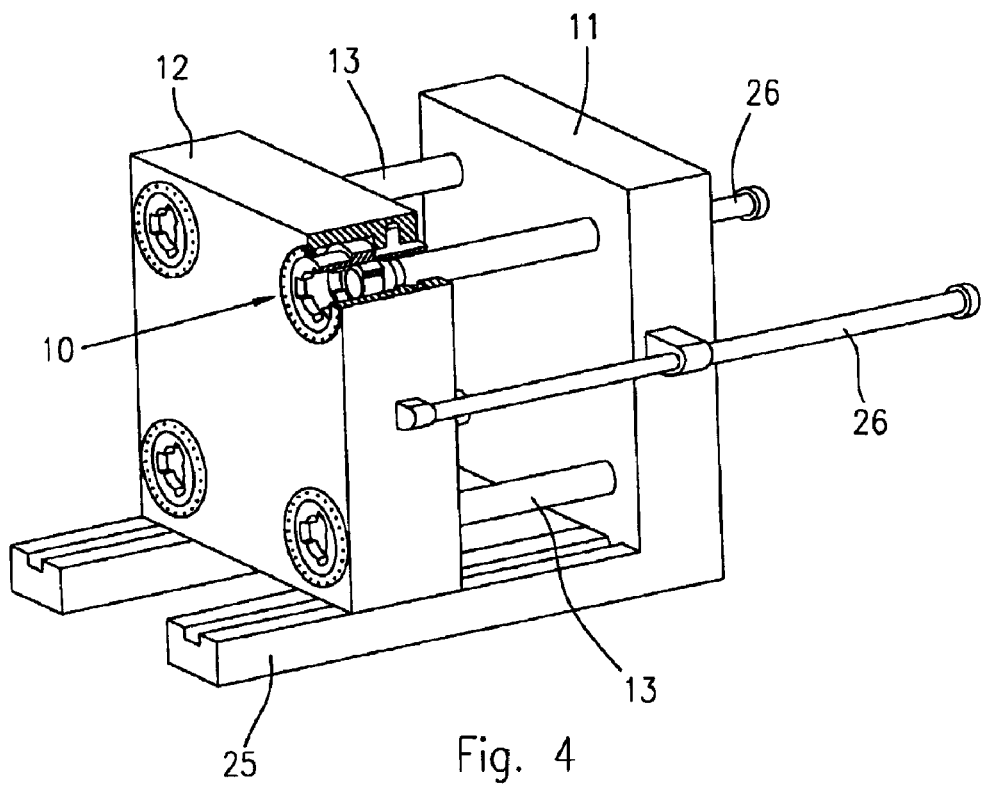
FIG. 4 shows a four tie bar press comprising a clamping device according to FIG. 1.
Figure 5:
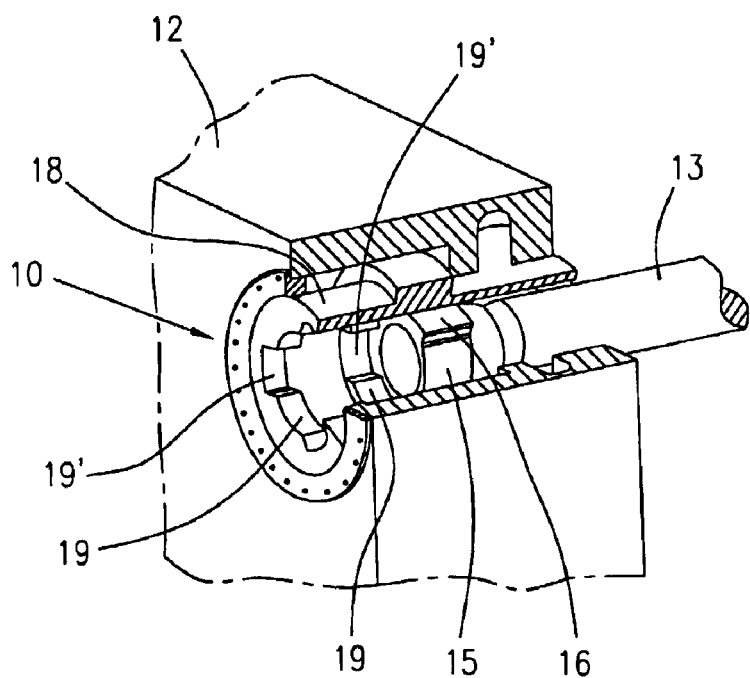
FIG. 5 shows an enlarged detail of one of the clamping devices of FIG. 4.

FIGS. 4 and 5 illustrate an application of the clamping device on a four-bar press; in FIGS. 4 and 5 the same reference numbers as in the preceding figures, have been used to indicate similar or equivalent parts.

As shown, the press comprises a fixed mold-support platen 11 and a movable mold-support platen 12 sliding along guides 25 to move to and from the fixed platen 11, for example by means of hydraulic actuators 26 or in any other suitable way; position indicators, not shown, generate the relative signals indicative of the position reached by the movable platen 12, to a control unit, during the opening and closing operations, stopping the movable platen 12 in a pre-established clamping position depending upon the thickness of the mold.

The tie bars 13 are fastened to the fixed platen 11, and extend towards the movable platen 12 passing through the respective clamping devices 10; each clamping device 10 is constructed as in the previously described FIGS. 1 to 3.

The clamping device operates, briefly as follows: assuming that the sleeves and piston unit 17, 18 are rotated so as to align their slots 19' with the teeth 16 of the heads 15 of the tie bars 13; in this condition, shown in FIG. 5, it is possible to make the movable platen 12 slide between an open condition and a closed condition of the press, and stop the movable platen 12 in any desired position, by operating the hydraulic cylinders 26 or other linear control device.

In this condition, it is also possible to axially move each clamping sleeve and piston unit 17, 18, by means of the respective control cylinder 14, stopping it in a selected position programmed by the control unit 35 which receives the control signals by the linear detector 36.

The positioning of the movable platen 12 in relation to the thickness of the mold can therefore be selectively achieved by a dual adjustment, obtained by the combination of a first step adjustment made possible by selecting a locking position provided by the toothing inside the sleeves 18, with a second fine adjustment for a final positioning by an axial movement of the sleeve and piston unit, depending on the thickness of the mold, before generating the clamping force.

It is assumed that the mold to be used has a required thickness and that the slots 19' of the sleeves 18 are aligned with the teeth 16 of the heads 15 of the tie bars; it is also assumed that the sleeves 18 completely protrude from the platen 12 in FIG. 2, with the platens 11 and 12 in the closed position of the mold, not shown.

In these conditions, the clamping sleeves 18 can be made to rotate in synchronism by a pre-established angle, to bring the abuting surfaces 22 of the teeth 19, to a condition axially aligned with the abuting surfaces of the teeth 16 of the locking heads 15 of the tie bars 13.

At this point, by feeding pressurised oil into the hydraulic cylinders 14, by means of a short and fast displacement of the pistons 17 it is possible to close the mold and exert the required rated clamping force.

The mold can be opened to remove a molded piece just as quickly, in that it is sufficient to simply release the pressure in the hydraulic cylinders 14, and rotate the clamping sleeves 18 in an opposite direction compared to the previous direction, until the slots 19' are realigned with the teeth 18, to enable the movable platen 12 to move back just far enough to open the mold.

It is now assumed that it is necessary to use a second mold having a greater thickness than the previous one; in this case, by maintaining the slots 19' of the sleeves 18 aligned with the teeth 16 of the heads 15 of the tie bars 13, it is possible to move the platen 12 completely away, to remove the old mold and replace it with the new one.

To select the new clamping position, the sleeves 18 can be previously moved back, for example by one pitch of the teeth, and finely adjusting their position in relation to the different thickness of the new mold, according to the working programme stored in the control unit 35.

Once the sleeves 18 have been moved in the new position, and the new mold has been assembled, it is possible to bring the movable platen 12 close to the fixed plate 11 to close and clamp the new mold in the previously described way.

Figure 6:
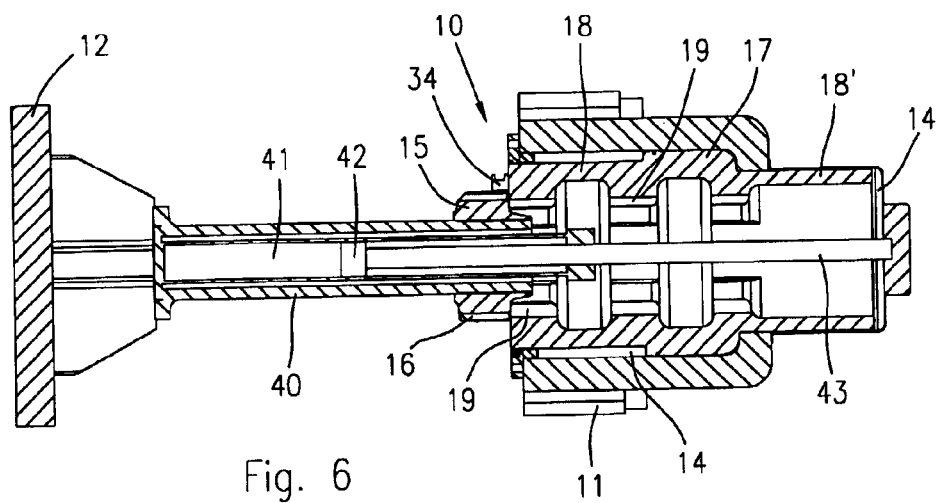
FIG. 6 shows a longitudinal cross-sectional view of a second embodiment of a clamping device according to the invention.
Figure 7:
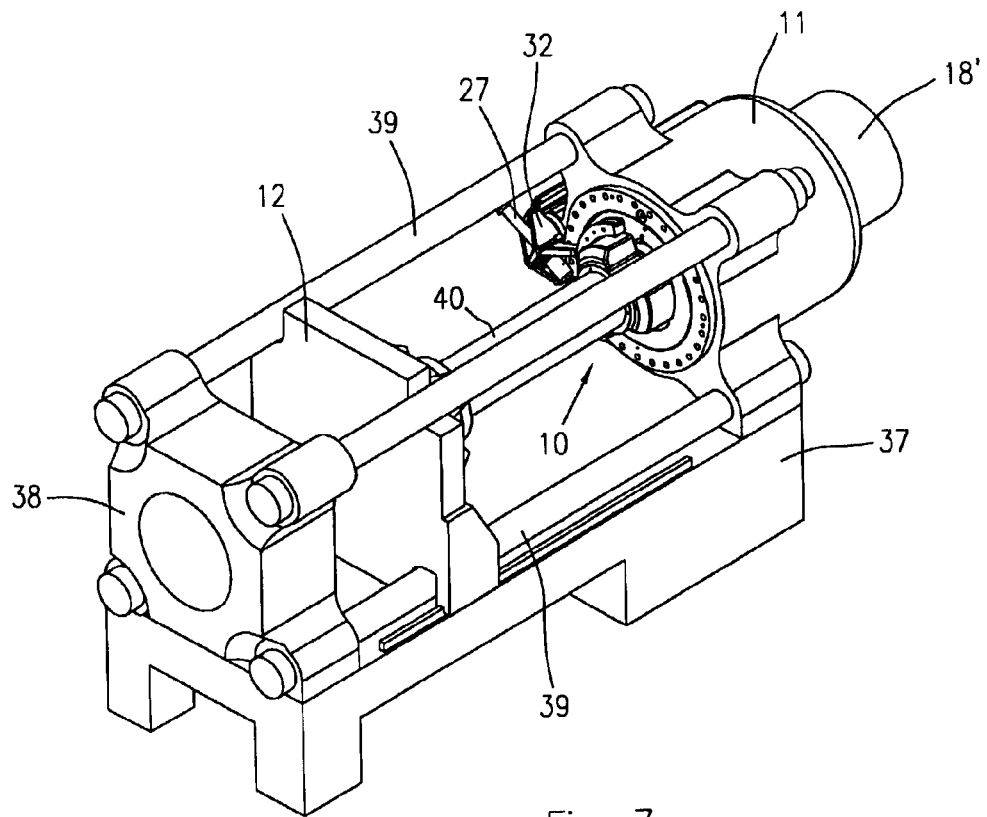
FIG. 7 shows a perspective view of a molding press, comprising a central tie bar provided with a clamping device according to the invention.

FIG. 6 of the drawings shows a further embodiment of a hydraulic clamping device according to the invention, which can be applied to small or medium-sized molding presses, for example, of the type having a single tie bar for generation of the clamping load; this is shown in the example in FIG. 7, in which the same reference numbers as in the previous example have been used to indicate similar or equivalent parts.

Here again, the clamping device 10 makes it possible to exert a clamping force for clamping a mold between a fixed platen 11 and a movable platen 12, or related part, for a press having a different geometrical configuration.

As shown in FIG. 7, the press comprises a support bedplate 37, and is provided on its ends with a first fixed platen 11, and second fixed platen 38; the two fixed platens 11 and 38 are firmly secured to each other by means of four peripheral tie bars 39.

The press also comprises a movable platen 12 in an intermediate position between the two fixed platens 11 and 38.

In the case shown in FIG. 7, the movable platen 12 and the fixed platen 38 are provided with means for supporting the two halves of a mold.

It can also be observed in FIG. 7 that the clamping device comprises a tie bar 40 for transmitting the clamping force, which extends centrally between the two platens 11 and 12.

The clamping device in the case shown in FIGS. 6 and 7, again comprises a hydraulic control cylinder 14 provided with an hollow piston 17 and sleeves 18, 18' which extend axially from both end of the same piston 17.

The sleeve 18 is axially aligned with the tie bar 40 and is provided again with an internal toothing 19 in a wholly similar way to the sleeve shown in FIG. 2.

The tie bar 40 is in turn provided with a head 15 having a radial toothing 16 designed to abut and engage with the teeth 19 inside the sleeve 18, in any of the required axial locking positions.

Here too, the piston and clamping sleeve unit 17, 18 is made to rotate by an actuator extending within the same tie bar 40.

The example in FIGS. 6 and 7, in view of the different geometry of the press, differs from the example shown in the preceding figures due to the fact that, in the first case the clamping device is designed to exert a pulling force on the tie rods 13 of the press, while in the case shown in FIGS. 6 and 7 the clamping device is designed to exert a pushing force on the single central tie rod 40. For the remaining, the clamping device of FIGS. 6 and 7 operates in a wholly identical way to the same device shown in FIGS. 1 to 5, to which reference is made.

In the case of FIGS. 1 to 5, the movement for shifting the movable platen, towards and away from the fixed platen, was achieved by means of linear actuators 26 disposed on the two sides of the press.

In the case shown in FIGS. 6 and 7, the force-transmitting tie bar 40 is in the form of a hollow, or tubular-shaped member housing a hydraulic actuator 41; the hydraulic actuator 41 is provided with a piston 42 having a long piston 43 which axially passes through the hollow piston 17 to be mechanically connected to a cover 44 secured to the sleeve 18', thereby obtaining a single unit for controlling the positioning and clamping the two platen 12 of the molding press.

From what has been described and shown in the accompanying drawings, it will be evident therefore that the invention is addressed to an automatic locking and clamping device for molding machines, as well as to injection-molding presses or different types of molding machines provided with a clamping device for which use is made of an extremely simple and highly reliable solution, capable of allowing a large range of adjustments and adaptations to molds of different thickness.

It is understood however that what has been described and shown herein with reference to the accompanying drawings, has been given purely by way of example and should in no way be construed as a limitation to the claimed invention. Consequently, other modifications or variations can be made to the clamping device, and to the molding machines, without thereby deviating from the scope of the appended claims.

I claim:

1. A hydraulic clamping device for a molding machine, comprising:

first and second mold support platens, one of said mold support platens being movable in respect to the other one;

a tie-bar axially extending from one of the platens, said tie-bar having a toothed head at one end bearing a single set of coplanar perpherally spaced teeth;

mold-thickness adjustment and tie-bar clamping means on the other one of said platens, for clamping the toothed head of the tie-bar, said mold-thickness adjustment and clamping means comprising:

a clamping sleeve and piston unit having a tie-bar passing through hole, and axially spaced apart tooth members inside the clamping sleeve;

said clamping sleeve and piston unit being axially movable and rotatably supported relative to said tie bar for a fine adjustment of its position and to selectively engage and disengage the toothed head of the tie-bar in a plurality of axially spaced-apart locking positions defined by said tooth members of the clamping sleeve; and control means to rotate the said sleeve and piston unit in each of said locking positions defined by the tooth members of the clamping sleeve.

2. Clamping device according to claim 1, comprising means for detecting the axial position of the clamping sleeve.

3. Clamping device according to claim 1, comprising a linear actuator for angular rotation of the clamping sleeve and piston unit, said actuator being slidingly supported parallel to the clamping sleeve, and connection means between said linear actuator and the clamping sleeve to allow axial movement and angular rotation of the same sleeve.

4. Clamping device according to claim 1, wherein said clamping sleeve is integral with the piston of said clamping sleeve and piston unit.

5. An injection molding machine for plastic materials comprising:
- a fixed platen and a movable platen for supporting a mold, and control means for moving the movable platen relative to the fixed platen of the machine;
- a plurality of peripherally arranged tie bars, which extend between the platens of the machine;
- each tie bar being fastened to one of the platens, and being provided with a toothed head at one end bearing a single set of coplanar peripherlly spaced teeth; and
- a mold-thickness adjustment and clamping means on the other one of said platens for clamping the toothed head of the tie bars, said mold-thickness adjustment and clamping means comprising:
- a clamping sleeve and piston unit of a control cylinder having a passing-through hole provided with a toothing in alignment with the toothed head of each associated tie-bar;
- each clamping sleeve and piston unit being movable and rotatably supported relative to an associated said tie bar to selectively engage the toothed head of the associated tie bar in a plurality of axially spaced apart locking positions defined by the toothing inside the sleeve; and
- control means to conjointly rotate said sleeve and piston units in each of the locking positions defined by the toothing of the clamping sleeve.

6. Injection molding machine according to claim 5, comprising means for detecting the axial position of the clamping sleeve, operatively connected to a programmable control unit.

7. Injection molding press, of the type comprising:
- a first and a second fixed platens rigidly connected by peripheral tie bars;
- a movable platen in an intermediate position between said first and second fixed platens;
- hydraulic control means for actuation of the movable platen, said hydraulic control means comprising:
- a central tie bar which extends between one of said fixed platens and the movable platen of the press, said central tie-bar comprising a toothed head at one end bearing a single set of coplanar peripherally spaced teeth; and
- mold-thickness adjustment and clamping means on said one fixed platen for clamping the toothed head of the central tie-bar;
- wherein said mold thickness adjustment and clamping means comprises:
- a clamping sleeve and piston unit of a control cylinder, having a passing-through hole provided with a toothing in alignment with the toothed head of the central tie-bar;
- said sleeve and piston unit being axially movable and rotatably supported relative to said tie bar to selectively engage the toothed head of the central tie-bar in a plurality of axially spaced apart locking positions defined by the toothing inside the clamping sleeve; and
- control means to rotate the clamping sleeve and piston unit in each of the locking positions of the movable platen of the press.

8. A molding press according to claim 7 in which control means are provided to displace the movable platen wherein said control means comprises a control cylinder coaxially extending inside the central tie bar.

* * * * *